United States Patent
Hankey

[11] 3,834,613
[45] Sept. 10, 1974

[54] CENTRIFUGE ROTOR WITH SAMPLE HOLDING MEANS AND MEANS FOR BALANCING THE SAME

[75] Inventor: James J. Hankey, Canton, Mass.
[73] Assignee: International Equipment Company, Needham Heights, Mass.
[22] Filed: Oct. 5, 1972
[21] Appl. No.: 295,143

Related U.S. Application Data
[63] Continuation-in-part of Ser. No. 119,469, March 1, 1971.

[52] U.S. Cl. ................................ 233/23 A, 233/26
[51] Int. Cl. ............................................. B04b 9/14
[58] Field of Search ....... 233/23 A, 26, 1 R; 74/573

[56] References Cited
UNITED STATES PATENTS
| | | | |
|---|---|---|---|
| 1,495,933 | 5/1924 | Swangara | 233/26 |
| 3,149,502 | 9/1964 | Caruso et al. | 74/573 |
| 3,376,759 | 4/1968 | Held | 74/573 |

FOREIGN PATENTS OR APPLICATIONS
| | | | |
|---|---|---|---|
| 1,102,655 | 3/1961 | Germany | 233/1 C |
| 862,591 | 3/1961 | Great Britain | 74/573 |

Primary Examiner—George H. Krizmanich
Attorney, Agent, or Firm—Kenway & Jenney

[57] ABSTRACT

A self-balancing rotor having a plurality of compartments for accommodating a sample container and having a spring-loaded weight constrained to move only in the radial direction. The relationship among the weight, sample container and compartment is defined by the following equation.

$$r_1 = r_2 - [x + (RW/yxbh + 1^2/2h) \tan \theta]$$

wherein
$r_1$ is the distance between the center of rotation of the rotor and the radially innermost surface of the compartment,
$r_2$ is the distance between the center of rotation of the rotor and the radially outermost surface of the compartment,
$x$ is the distance between the radially innermost surface of the sample container and the radially outermost surface of a compartment,
$b$ is the width of the compartment,
$h$ is the height of the compartment,
$R$ is the distance between the center of rotation of the rotor to the center of gravity of the sample container plus sample,
$W$ is the total weight of the container and sample,
$y$ is the density of the weight,
$\theta$ is the angle of incline of a surface of the weight with respect to a vertical plane and
$1$ is the distance from the top of the weight to the intersection of the inclined surface, if any, and the radially outward surface of the weight. The angle, $\theta$, ranges from 0 to $\tan^{-1} [r_2 - r_1 - x]$ 2 Claims, 2 Drawing Figures

CENTRIFUGE ROTOR WITH SAMPLE HOLDING MEANS AND MEANS FOR BALANCING THE SAME

This application is a continuation-in-part of application Ser. No. 119,469, filed Mar. 1, 1971.

This invention relates to a method and apparatus for balancing a rotating centrifuge.

Centrifuge rotors adapted to separate liquid samples based on density have a plurality of compartments into which fit the sample containers. Many times, the number of samples being processed is less than the available compartments thereby resulting in the rotor being unbalanced about its central vertical axis. Thus, in automatic chemical analysis systems, samples are centrifuges in a preset test sequence to maintain proper sample identification and the number of samples processed may be less than the centrifuge compartments available. Under these conditions, the technician cannot redistribute the sample containers to attain a balanced load in the rotor. When the rotor is spun, this imbalance generates vibrations that damage the motor bearings and may lead to bearing failure. In addition, the vibrations reduce the safe operable speed of the rotor and agitate any interface formed between constituents of the sample being separated, thereby causing inadequate separation. It would be highly desirable to provide a simplified means for preventing rotor vibration that can be implemented automatically and is operable regardless of the number of samples being processed.

The present invention provides a rotor having compartments into which are placed spring loaded weights constrained to move in the radial direction only. The weights fill only a portion of the compartment and are shaped to permit the insertion therein of a sample container. The weight and container are shaped so that when the container is inserted into the compartment it prevents the weight from moving in a radial direction. The position and density of the weight and the shape of the compartment are defined by the following equation.

$$r_1 = r_2 - [\, x + (RW/yxbh + l^2/2h) \tan \theta \,]$$

wherein $r_1$ is the distance between the center of rotation of the rotor and the radially innermost surface of the compartment, $r_2$ is the distance between the center of rotation of the rotor and the radially outermost surface of the compartment, $x$ is the distance between the radially innermost surface of the sample container and the radially outermost surface of a compartment.

$b$ is the width of the compartment, $h$ is the height of the compartment, $R$ is the distance between the center of rotation of the rotor to the center of gravity of the sample container plus sample, $W$ is the total weight of the container and sample, $y$ is the density of the weight, $\theta$ is the angle of incline of a surface of the weight with respect to a vertical plane and $l$ is the distance from the top of the weight to the intersection of the inclined surface, if any, and the radially outward surface of the weight. The angle, $\theta$, ranges from 0 to $\tan^{-1} [r_2 - r_1 - x/l]$.

The invention will be more fully described with reference to the accompanying drawings. In the drawings, the weight and sample container are shown separated from each other and the compartment walls merely for convenience. It is to be understood that the weight and sample container form a tight fit in the compartment to prevent movement when the centrifuge is spun.

Figure 1:
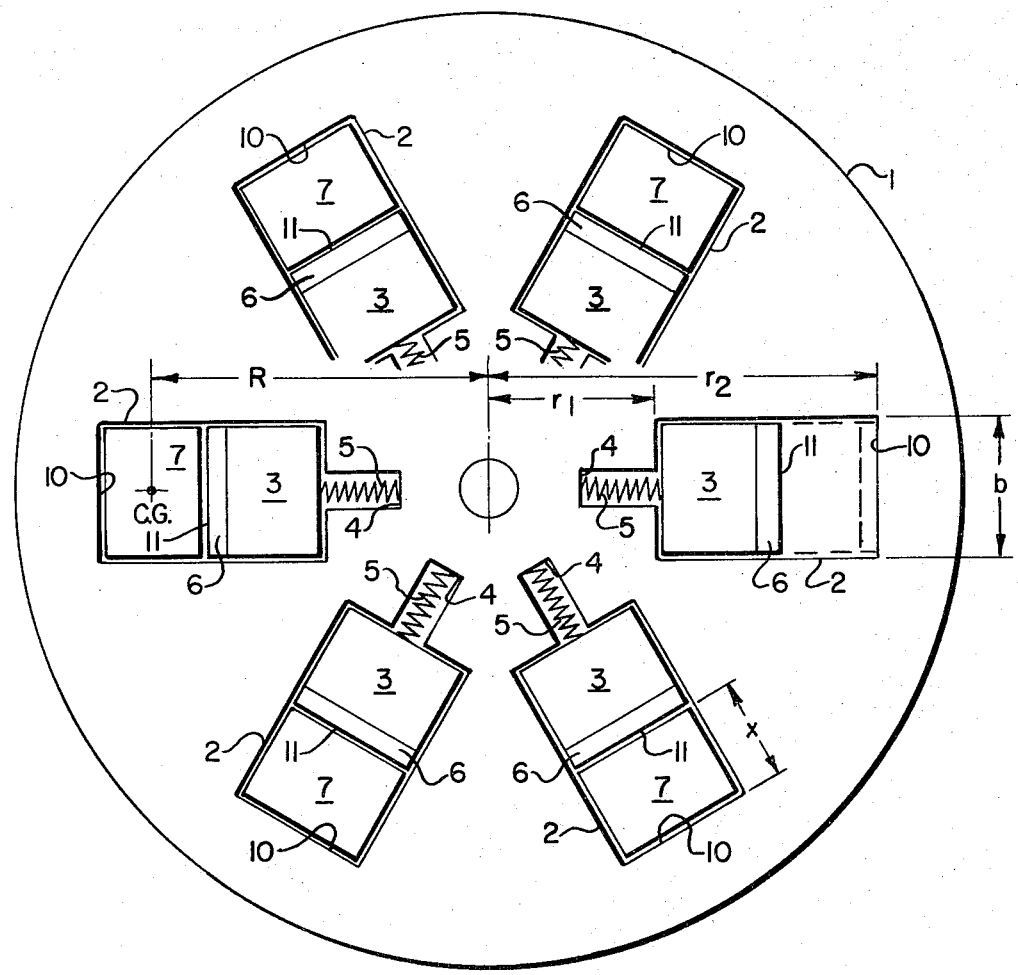
FIG. 1 is a top view of a rotor of this invention.
Figure 2:
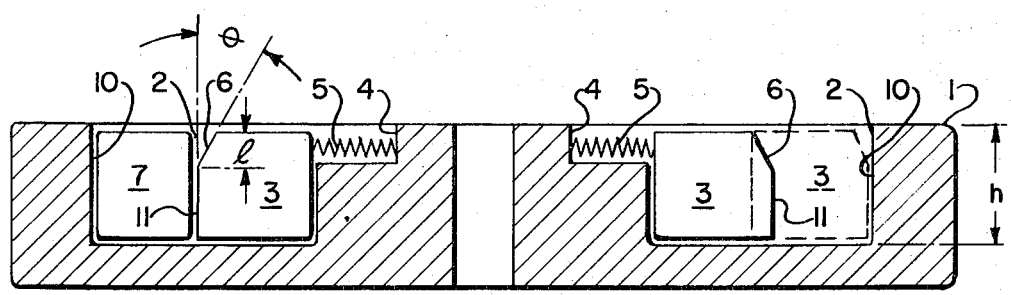
FIG. 2 is a vertical partial cross-sectional view of the centrifuge of FIG. 1.

The centrifuge rotor 1 is provided with a plurality of equally spaced compartments 2 into each of which are placed weights 3. Each of the weights 3 is attached to the radially innermost surface 4 of the compartment 2 by means of a spring 5. The weights 3 have an inclined surface 6 adjacent to the portion of the empty compartment into which are to be placed the sample containers. The inclined surface 6 provides a means for easily inserting the sample container 7 into the compartment 2. As shown in the figures, the positions of the weight are designated by solid lines when the rotor is at rest and by broken lines when the rotor is rotated. The factors set forth in the equation above are shown in the figures.

When the rotor 1 is spun, the weights 3 will move radially outwardly to the position shown by the broken lines when no sample container is placed into the compartment 2. However, when a sample container 7 is placed into the compartment 2, the weight 3 is constrained by the sample container 7 which is wedged between the radially outermost surface 10 of the compartment and the radially outermost surface 11 of the weight 3.

In order to satisfy the above equation, to attain proper rotor balance, either the size and density of the weight 3 can be changed or the size of the sample system can be changed. Thus, for a given type of weight 3, the sample system should have a certain weight, $W$, to satisfy the equation. On the other hand, when it is desired to change the type of sample system thereby changing its weight, the weight 3 can be replaced with an appropriate weight to accommodate the new sample system.

The weight and sample container can have any desired shape so long as they are complementary within the compartment to prevent their movement when the rotor is spun. The use of a weight having an inclined surface adjacent the sample container has the advantages of simplifying the placement of the sample container and acts to maintain the container in the compartment during centrifuge rotation.

Referring to the equation above, in a typical apparatus employing ten containers each filled with one milliliter of blood, to attain desired centrifugal force, $r_2$ is 7.44 inches, $R$ is 6.75 inches, $W$ is 2.71 pounds, $b$ is 3.20 inches, $h$ is 4.82 inches, $x$ is 2.62 inches and the density of counterweights made from stainless steel is 0.281 lb/in$^3$. Solving the equation, $r_1$ is 3.10 inches. When employing a counterweight wherein $\theta$ is 10° and $l$ is 2.41 inches, the volume of a counterweight is 24.89 cubic inches and its weight is 6.97 pounds.

I claim:

1. In a rotor having a plurality of compartments evenly spaced around the circumference of the rotor and equidistant from the vertical axis of the rotor, automatic balancing means comprising a spring-loaded weight in each compartment constrained to move only radially, said weights having a volume sufficiently less than the compartment volume, a sample container in each compartment, the relationship among the weight, sample container and compartment being defined by the following equation:

$$r_1 - r_2 - [\ x + (RW/yxbh + l^2/2h) \tan \theta\ ]$$

wherein
- $r_1$ is the distance between the center of rotation of the rotor and the radially innermost surface of the compartment,
- $r_2$ is the distance between the center of rotation of the rotor and the radially outermost surface of the compartment,
- $x$ is the distance between the radially innermost surface of the sample container and the radially outermost surface of a compartment,
- $b$ is the width of the compartment,
- $h$ is the height of the compartment,
- $R$ is the distance between the center of rotation of the rotor to the center of gravity of the sample container plus sample,
- $W$ is the total weight of the container and sample,
- $y$ is the density of the weight,
- $\theta$ is the angle of incline of a surface of the weight with respect to a vertical plane
- $l$ is the distance from the top of the weight to the intersection of the inclined surface, if any, and the radially outward surface of the weight and the angle $\theta$, ranges from 0 to $\tan^{-1} [r_2 - r_1 - xl\ ]$.

2. The apparatus of claim 1 wherein each weight has a portion of the radially outermost surface inclined outwardly.

* * * * *